C. O. BANER.
ROTARY STEAM ENGINE.
APPLICATION FILED NOV. 23, 1920.
1,421,892.
Patented July 4, 1922.
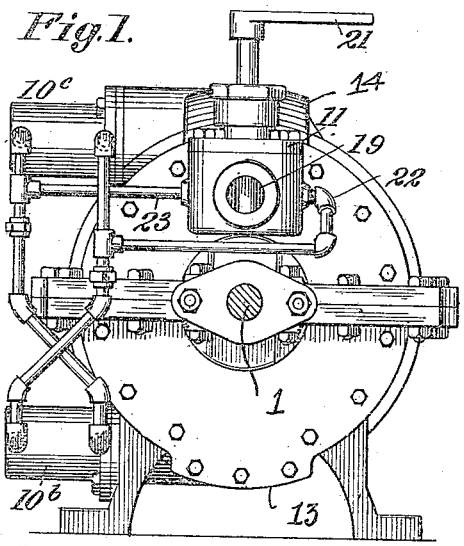
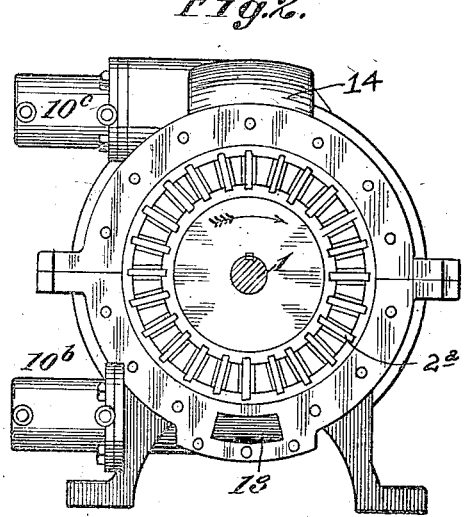
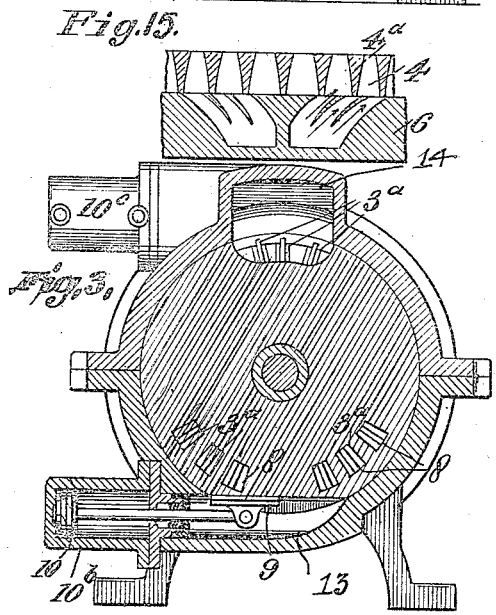
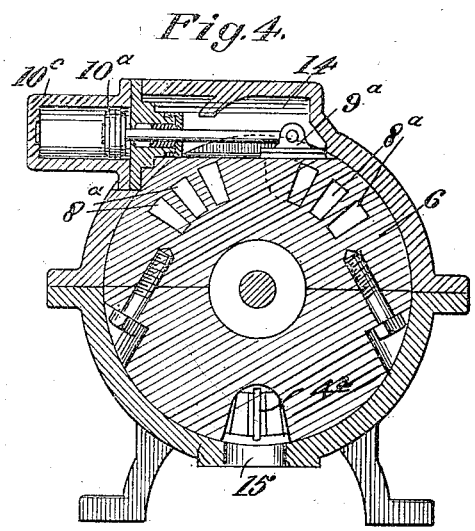
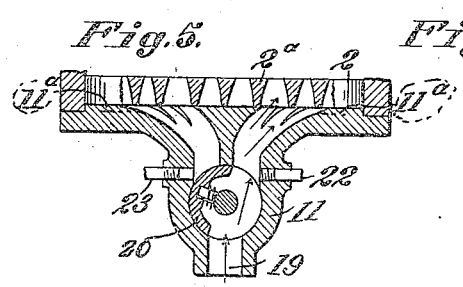
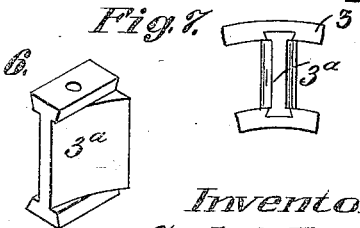
Inventor,
Carl O. Baner,
by Munn & Co.
Attorneys

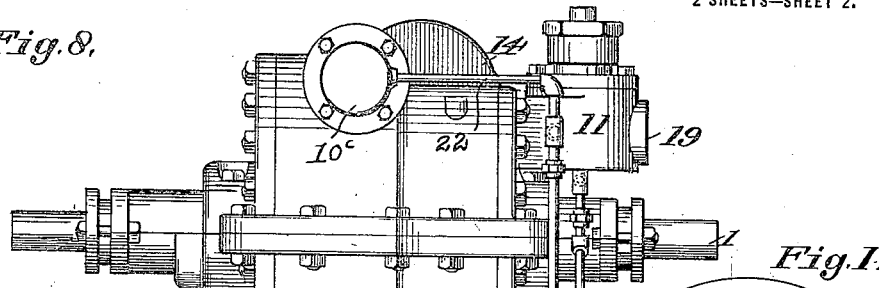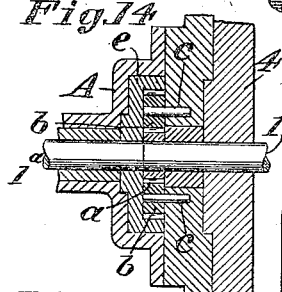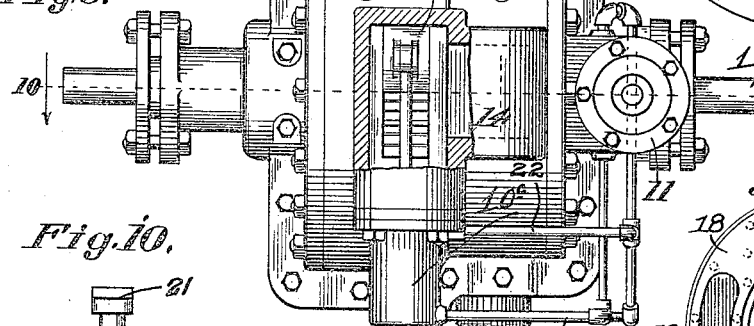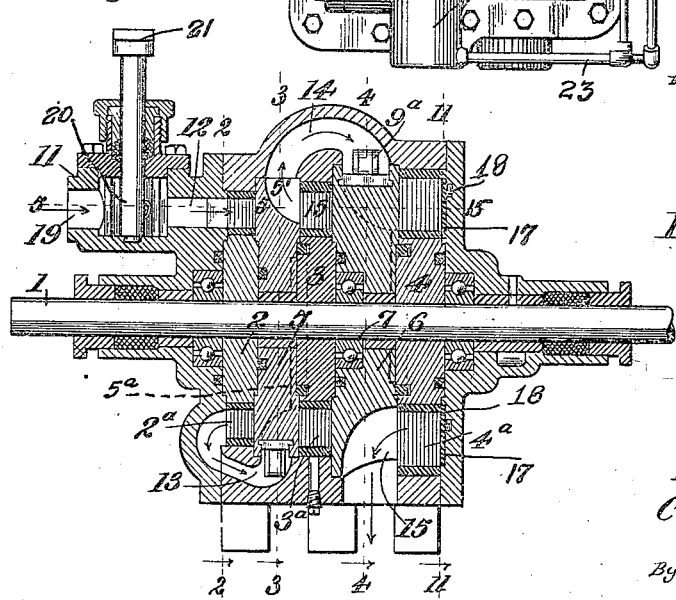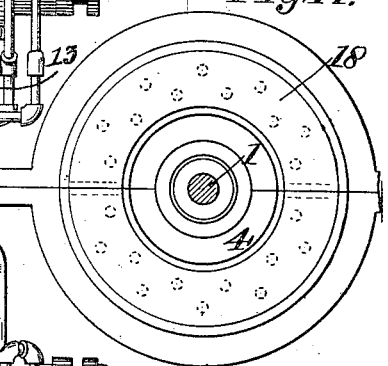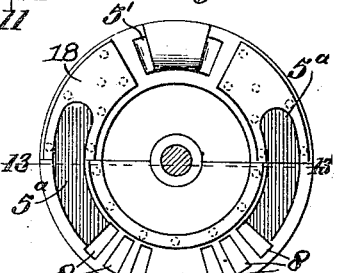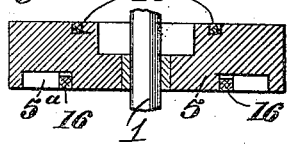

UNITED STATES PATENT OFFICE.

CARL OSCAR BANER, OF SAN FRANCISCO, CALIFORNIA.

ROTARY STEAM ENGINE.

1,421,892. Specification of Letters Patent. Patented July 4, 1922.

Application filed November 23, 1920. Serial No. 426,066.

*To all whom it may concern:*

Be it known that I, CARL OSCAR BANER, a subject of the King of Sweden, and resident of San Francisco, county of San Francisco, State of California, have invented a new and useful Rotary Steam Engine, of which the following is a specification.

My invention relates in general to engines and has reference more particularly to a rotary steam engine.

The primary object of my invention is to provide a slow speed rotary steam engine which will operate with the greatest efficiency.

Another object of my invention is to produce an engine of the class described which will do away with gearing and other unnecessary parts which have heretofore formed a part of rotary and the like engines.

A further object of the invention is to employ a plurality of stages in which the steam is used and thus derive a maximum efficiency from any given quantity of steam.

A still further object is to reduce friction to a minimum by employing a small number of friction creating parts.

With these and still further objects in view, the invention will be more readily understood upon reference to the accompanying drawings, which show that form of the invention which has been selected for the purpose of illustration. In said drawings:

Figure 1 is an end elevation showing the piping for the reversing valves;

Figure 2 is a cross-section on the line 2—2, Figure 10;

Figure 3 is a cross-section on the line 3—3, Figure 10;

Figure 4 is a cross-section on the line 4—4, Figure 10;

Figure 5 is a horizontal section on the line 5—5, Figure 10;

Figure 6 is a detail perspective view of one of the blades;

Figure 7 is an edge view of one of the blades in position;

Figure 8 is a side elevation showing the reversing valves;

Figure 9 is a top plan view showing one of the reversing valves partly in section;

Figure 10 is an axial section on the line 10—10, Figure 9;

Figure 11 is a cross-section on the line 11—11, Figure 10;

Figure 12 is a view in elevation of the steam chest showing the rings and expansion chambers;

Figure 13 is a sectional view on the line 13—13, Figure 12, and

Figure 14 is a longitudinal section of the gearing, which may or may not be used.

Figure 15 is a cross-section along line 15—15 of Figure 10.

Referring now to the drawings in detail, 1 represents the power shaft upon which the rotors 2, 3 and 4 are mounted, all three of which being keyed to the shaft and adapted to rotate the same; provision being made, however, to permit the shaft to move slightly longitudinally due to expansion. The rotors are spaced apart on the shaft in stages by the steam chests 5 and 6 which are co-axially positioned on the shaft, with an anti-friction bearing 7 arranged for the chest 6. Each one of the steam chests is divided radially and includes an intake end and an outlet end (see Figures 3 and 4), the intake being shown in dotted lines at the bottom of the chest 5 in Figure 10, and the ports 8 therefor being shown in Figures 3 and 12. These ports are preferably six in number; three on each side. The outlet is shown as at 5'. The intake for the chest 5 is controlled by the sliding valve 9 which in turn is actuated by the steam plunger 10. This valve 9 is adapted to open or close either set of ports according to the direction of rotation; for instance, as shown in Figure 3, the rotor 3 will be rotated anti-clockwise; whereas if the valve were moved forward the other set of ports 8 would be uncovered and the opposite set closed, which would cause the rotor 3 to rotate in a reverse direction. The steam is admitted to the rotor 2 direct from the throttle 11 through the port 12 and the same is exhausted into the by-pass 13 to the chest 5; whereupon it will be treated as above mentioned and exhausted from the rotor 3 into the by-pass or steam passage 14 to the chest 6. The chest 6 is constructed the same as the chest 5, except that the valve 9ª in this stage is on the top instead of the bottom. Both chests include arcuate shaped recesses or expansion chambers 5ª on diametrically opposite sides, as best shown in Figures 12 and 13. These chambers will enable the steam to expand to give the rotor the full advantage of the steam. It is to be noted that a like chamber is arranged as at 11ᵃ in the casing of the throttle 11 adjacent the rotor 2.

The valve 9ᵃ is actuated by the steam plunger 10ᵃ. The ports 8ᵃ in the chest 6 are arranged the same as the ports 8 except that they are in the top instead of the bottom. In reversing in this stage, the valve 9ᵃ is moved to uncover the opposite set of ports. The passage between the chest 6 and the rotor 4 is shown in dotted lines in Figure 10. The exhaust from the last and final stage from the rotor 4 is through the passage 15.

Each one of the rotors will be provided with a series of blades 2ᵃ, 3ᵃ and 4ᵃ. The blades are V-shaped and may be separately removed from the rotor ring (see Figure 7) in which they have a dovetail fit.

The chests 5 and 6 and the rotors 2, 3 and 4 use the customary steam rings 16 to prevent leakage of steam through the bearings and stuffing boxes. To prevent escape of steam past the blades when they become worn, spring pressed packing rings 17 are arranged on the rotor 4; as shown at 18 in Figure 10, the springs are adapted to maintain the rings against the blades under tension.

The engine casing is divided in two parts joined along their flanges by suitable bolts, and side plates are fixed by bolts to the engine ends.

As stated, the main intake port 12 communicates with the control throttle 11. This throttle comprises a casing having an inlet as at 19 communicating with the steam supply. The throttle valve 20 is rotatable by the lever 21 so that the same may open or close the inlet 19 and to also control the effective port area of the port 12 which is divided so the rotor 2 may be reversed by directing the intake of steam at different angles to the blades 2ᵃ thereof.

Arranged in the port 12 inside of the valve 20 is the piping 22 and 23 for admitting steam to the cylinders 10ᵇ and 10ᶜ for the plungers 10 and 10ᵃ. Each of these steam pipes includes a dual supply for both the plunger cylinders 10ᵇ and 10ᶜ. Therefore, considering the throttle valve 20 as in the position shown in Figure 5, steam would be supplied through the piping 22 and through the two branches thereof to both the cylinders 10ᵇ and 10ᶜ, the steam being admitted to the cylinder 10ᵇ on the outside of the plunger 10 and on the inside of the plunger 10ᵃ in the cylinder 10ᶜ. The positions of the plungers in Figures 3 and 4 are shown as if the throttle valve were open to admit steam into the piping 23.

With reference to the gearing shown in Figure 14, this may be used within the casing co-axially of and adjacent the rotor 4 or the rotor 2. A special end plate, such as A, would of course be required to house the same. The gearing may comprise a driving gear $a$ keyed to the shaft 1 and adapted to mesh with a pair of idlers $b$ which are free to rotate on the spindles $c$, the ends of which being set in the side of one of the end plates of the engine casing. Arranged around and enclosing the idlers $b$ is an internal gear $e$ which is keyed to the divided end 1ᵃ of the shaft 1 and adapted to drive the same.

The operation of the engine is as follows:

Steam from any suitable source of supply is introduced through the intake 19 of the throttle 11 where it will be introduced through the divided port 12 to the blades 2ᵃ of the rotor 2. The position of the valve 20 of the throttle will determine in which direction the rotor 2 will be rotated by the incoming steam. The position of this valve also will affect the position of the valves 9 and 9ᵃ, as it will open or close either the piping 22 or 23 according to its position, which will thus manipulate the valves 9 and 9ᵃ to permit the rotors 3 and 4 to rotate in the same direction as the rotor 2. The steam in being exhausted from the rotor 2 will be introduced through the passage 13 into the steam chest 5 at the bottom thereof through those ones of the intake ports 8 left open by the valve 9. The steam will then be exhausted from the steam chest 5 into the next stage of the engine, which will be the rotor 3, which will rotate the same from where it will be exhausted into the passage 14 and into the next stage of the engine through that set of intake ports 8ᵃ in the chest 6 left uncovered by the valve 9 and from the chest into the rotor 4 and then through the final exhaust 15. According to the present illustrative embodiment, there are three stages shown and described, but the number of stages is immaterial, as there may be more than three, or just a single stage; for instance, a suitable exhaust could be arranged in the passage 13 which would do away with all but one of the rotors, or an exhaust could be made in the passage 14 which would require only two rotors.

I claim:

1. An engine of the character described, comprising a housing, a shaft rotatable therein, rotors mounted on the shaft and a stationary steam chest mounted between each two rotors, V-shaped blades on each rotor presenting symmetrical working faces in both directions, sets of steam passages in the steam chests on opposite sides communicating with adjacent rotors in opposite directions, the steam passages in each set being divided so as to lead into opposite directions, and means for controlling the steam passages allowing the rotors to be actuated in either direction.

2. An engine of the character described, comprising a housing, a shaft rotatable therein, rotors mounted on the shaft and a stationary steam chest mounted between each two rotors, V-shaped blades on each rotor presenting symmetrical working faces in both directions, sets of steam passages in the steam chests on opposite sides communicating with adjacent rotors in opposite directions, the steam passages in each set being divided so as to lead into opposite directions, and having expansion chambers associated therewith for allowing a plurality of blades to be attacked simultaneously, and means for controlling the steam passages allowing the rotors to be actuated in either direction.

3. An engine of the character described, comprising a housing, a shaft rotatable therein, rotors mounted on the shaft and a stationary steam chest mounted between each two rotors, V-shaped blades on each rotor presenting symmetrical working faces in both directions, sets of steam passages in the steam chests on opposite sides communicating with adjacent rotors in opposite directions, the steam passages in each set being divided so as to lead into opposite directions, and means for controlling the steam passages allowing the rotors to be actuated in either direction, said means comprising sliding valves associated with the passages in each steam chest, a main steam admitting valve and an operative connection between the main valve and the sliding valves adapted to actuate both of them simultaneously.

CARL OSCAR BANER.